R. J. McKINLEY & W. T. AITKEN.
MANURE LOADER.
APPLICATION FILED JAN. 24, 1908.

907,272.

Patented Dec. 22, 1908.

Witnesses.

Inventors.
Robt. J. McKinley
Wm. T. Aitken
by E. J. Fetherstonhaugh
Atty.

UNITED STATES PATENT OFFICE.

ROBERT JOHN McKINLEY AND WILLIAM THOMAS AITKEN, OF ALLISTON, ONTARIO, CANADA.

MANURE-LOADER.

No. 907,272.      Specification of Letters Patent.      Patented Dec. 22, 1908.

Application filed January 24, 1908. Serial No. 412,507.

*To all whom it may concern:*

Be it known that we, ROBERT JOHN MC-KINLEY and WILLIAM THOMAS AITKEN, both subjects of the King of Great Britain, residents of the town of Alliston, in the county of Simcoe, Province of Ontario, in the Dominion of Canada, have invented certain new and useful Improvements in Manure-Loaders, of which the following is a specification.

The invention relates to improvements in manure loaders as described in the following specification and illustrated in the accompanying drawings that form part of the same.

The invention consists essentially in the novel construction and arrangement of parts whereby the manure is gathered and hoisted by hinged forks held to their closed position during the hoisting operation.

The objects of the invention are to minimize the amount of time and labor in clearing up and loading the accumulation of straw and manure in barnyards, and to devise a simple, strong and durable machine, easily operated.

Figure 1:
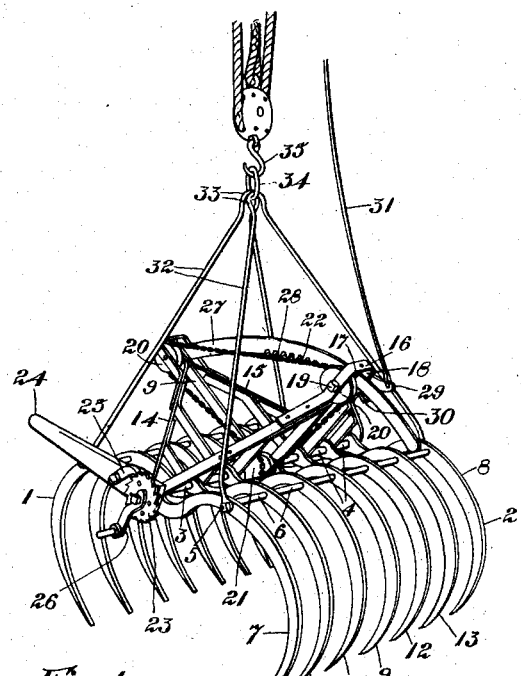
Figure 2:
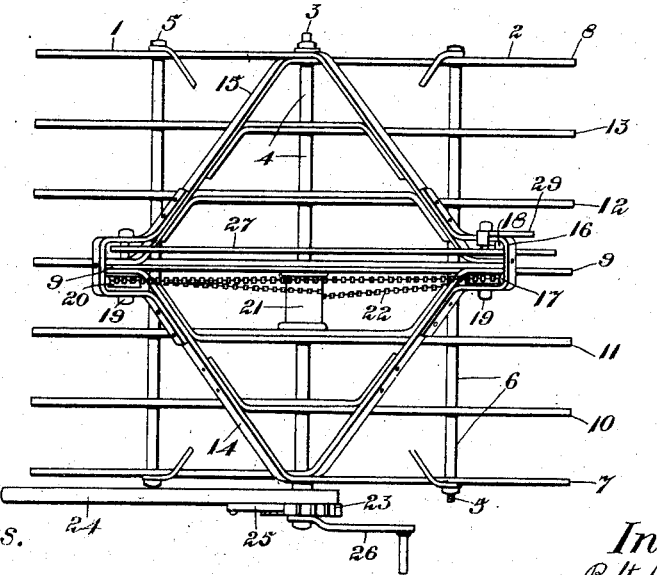

In the drawings Figure 1 is a perspective view of the loader shown in position ready to dig up a load. Fig. 2 is a plan view of the device.

Referring to the drawings, 1 and 2 are a pair of forks hinged upon the rotatable rod 3 intermediate of their length and having a plurality of downwardly extending prongs curved inwardly at the lower ends. The prongs of each of the forks 1 and 2 are preferably spaced equidistant in the length of the forks, the prongs of one fork fitting beside and abutting the prongs of the other fork. The prongs of the said forks are supported laterally by the spacing ferrules 4 encircling the rod 3 and inserted between each pair of forks, and also by the rods 5 and spacing ferrules 6 secured to said prongs below the pivotal point. The outer prongs 7 and 8 of each of the forks are bent inwardly and rigidly secured to the center prong 9 at its outer end. The upper ends of the intermediately arranged prongs 10, 12, 12 and 13 extend outwardly to and abut the angularly bent portions 14 and 15 of the prongs 7 and 8 and are rigidly secured thereto. It will be seen from this description that the prongs of each fork are all rigidly secured together, forming strong and rigid forks.

16 are U-shaped brackets rigidly secured at the base to the outer end of the prongs 9 and having the side portions extending parallel with the said central prong and forming the recesses 17 and 18 to either side of said central prong, the ends of said bracket being rigidly secured to the portions 14 and 15 of the prongs 7 and 8.

19 are bolts extending through the sides of the brackets 16 and the central prong 9 and rigidly secured thereto.

20 are grooved pulleys journaled on the bolts 19 and arranged in the recesses 17.

21 is a chain drum fixedly secured to the rotatable rod 3 and extending between the prongs 9 and 11.

22 is a chain extending from the drum 21 over the grooved pulleys 20 and back to the said drum, rigidly secured to said drum and adapted to be wound thereon on the rotation of the drum. The winding of the chain 22 upon the drum 21 draws the upper ends of the forks 1 and 2 inwardly toward each other consequently swinging the said forks on their pivots and drawing the curved ends of the said forks together to dig into and grip a load.

Considerable power is required in order to turn the rod 3 when the forks are being forced into the manure, therefore we have provided a ratchet lever mechanism for turning said rod.

23 is a ratchet wheel rigidly secured to one end of the rod 3 extending beyond the forks.

24 is a lever rotatably mounted on the rod 3 preferably between the ratchet wheel 23 and the outer prong of the forks and having a pivotal dog 25 secured thereto and adapted to engage the teeth of said ratchet wheel.

26 is a crank fixedly secured to the extending end of the rod 3 to the outside of the ratchet wheel 23 and adapted to be used in turning the rod 3 to unwind the chain 22 from the chain drum.

It is desirable, in the use of this machine that the pivotal forks 1 and 2 be held securely in their closed position by some means independent of the chain 22 and its co-acting mechanism and for this purpose we provide a pivotal ratchet bar 27 having the ratchet teeth 28 in its under edges. The bar 27 is pivoted at one end on the bolt 19 in the recess 18 in the fork 1 and extends between the said forks and through the recess 18 in the fork 2, the under edge resting on the upper side of the bolt 19 and sliding thereon.

It will be readily seen that as the upper ends of the forks are drawn together the bar 26 will slip freely over the bolt 19, the ratchet teeth 28 engaging the said bolt and holding the forks from spreading while the device is being lifted.

29 is a dog pivotally secured to the fork 2 at the side of the U-shaped bracket 16 and having a lug 30 extending laterally therefrom and adapted to engage the under edge of the bar 27 to lift said bar and release it from the engagement with the bolt 19. A suitable cord 31 may be attached to the dog 29 so that it may be operated when the machine is lifted out of reach.

32 are bails pivotally secured to the outwardly extending ends of the rods 5 and having the central loop portions 33 held together by a ring 34 adapted to receive the hoisting hook 35.

In operation, the device is placed on the material to be lifted, in its open position and the forks drawn together by operating the ratchet lever to turn the rod 3. The weight of the device and the formation of the prongs insures the sinking of the forks into the said material. The ratchet bar 27 holds the forks securely closed and the chain 22 may be released before the device is lifted. The device may then be lifted and carried to any desired place and by a suitable crane or carrier and when in the desired position the load may be released by pulling on the cord 31 to operate the dog 29 and release the bar 27. As soon as the bar 27 is released the weight of the machine and its load causes the forks to swing outwardly on their pivots releasing the said load.

What we claim as our invention is:—

1. A manure loader, comprising, a pair of forks each having a plurality of prongs rigidly secured together at one end and having curved outer ends, a rotatable rod extending through the prongs of said forks intermediate of their length and pivotally connecting said forks together, a flexible connection extending across and between the upper ends of said forks and downwardly therefrom and having its ends fixedly secured to said rotatable rod and adapted to draw the upper ends of said forks inwardly toward each other on rotation of said rod.

2. A manure loader, comprising, a pair of forks each having a plurality of prongs rigidly secured together at one end and having curved outer ends, a rotatable rod extending through the prongs of said forks intermediate of their length and pivotally connecting said forks together, pulleys suitably journaled at the upper ends of said forks, a drum fixedly secured to said rotatable rod and rotating therewith, flexible means secured to said drum and extending around said pulleys adapted to draw the outer end of said forks inwardly on the rotation of said drum, and means for rotating said drum, substantially as described.

3. A manure loader, comprising, a pair of forks each having a plurality of prongs rigidly secured together at one end and having curved outer ends, a rotatable rod extending through the prongs of said forks intermediate of their length and pivotally securing said forks together, pulleys suitably journaled at the upper ends of said forks, a drum fixedly secured to said rotatable rod and rotating therewith, flexible means secured to said drum and extending around said pulleys adapted to draw the outer end of said forks inwardly on the rotation of said drum, a ratchet wheel fixedly secured to said rotatable rod, a lever pivotally supported from said rotatable rod, and a pawl pivotally secured to said lever and co-acting with said ratchet wheel, substantially as described.

4. A manure loader, comprising, a pair of forks pivotally secured together intermediate of their length, said forks having a plurality of prongs curved at one end the outer pair of prongs being bent inwardly toward the center above their pivotal point and rigidly secured together and the intermediately arranged prongs rigidly secured to the inwardly bent portions of the aforesaid prongs, and mechanical means for drawing the upper portion of said forks toward each other to close the curved points of said pair of forks together, substantially as described.

Signed at Collingwood, in the Province of Ontario, Dominion of Canada, this 7th day of January, 1908.

ROBERT JOHN McKINLEY.
WILLIAM THOMAS AITKEN.

Witnesses:
A. G. SEYFERT,
JAS. WHITESIDE.